US009571347B2

(12) United States Patent
Siddiqui et al.

(10) Patent No.: US 9,571,347 B2
(45) Date of Patent: *Feb. 14, 2017

(54) REACTIVE AUTO-SCALING OF CAPACITY

(71) Applicant: Amazon Technologies, Inc., Seattle, WA (US)

(72) Inventors: Muhammad Ali Siddiqui, Snoqualmie, WA (US); Kendra A. Yourtee, Seattle, WA (US); Alexander S. Borst, Seattle, WA (US); Sanjeev K. Verma, Seattle, WA (US); Gregory Suhyun Kang, Seattle, WA (US); Josh M. Goodspeed, Knutsford (GB); Thomas L. Keller, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/804,625

(22) Filed: Jul. 21, 2015

(65) Prior Publication Data

US 2015/0339169 A1    Nov. 26, 2015

Related U.S. Application Data

(63) Continuation of application No. 14/506,453, filed on Oct. 3, 2014, now Pat. No. 9,112,782, which is a
(Continued)

(51) Int. Cl.
| | |
|---|---|
| G06F 9/46 | (2006.01) |
| H04L 12/24 | (2006.01) |
| H04L 12/26 | (2006.01) |
| H04L 29/08 | (2006.01) |
| G06F 9/50 | (2006.01) |

(52) U.S. Cl.
CPC .............. *H04L 41/0896* (2013.01); *G06F 9/46* (2013.01); *G06F 9/5027* (2013.01); *G06F 9/5061* (2013.01); *G06F 9/5077* (2013.01); *H04L 43/0894* (2013.01); *H04L 67/10* (2013.01); *H04L 67/16* (2013.01); *G06F 2209/508* (2013.01); *G06F 2209/5019* (2013.01)

(58) Field of Classification Search
None
See application file for complete search history.

(56) References Cited

U.S. PATENT DOCUMENTS

| | | |
|---|---|---|
| 6,510,353 B1 | 1/2003 | Gudaz et al. |
| 7,574,382 B1 | 8/2009 | Hubert |
| | (Continued) | |

*Primary Examiner* — Gregory A Kessler
(74) *Attorney, Agent, or Firm* — Knobbe, Martens, Olson & Bear, LLP (57) ABSTRACT

Examples of systems and methods are described for managing computing capacity by a provider of computing resources. The computing resources may include program execution capabilities, data storage or management capabilities, network bandwidth, etc. Multiple user programs can consume a single computing resource, and a single user program can consume multiple computing resources. Changes in usage and other environmental factors can require scaling of the computing resources to reduce or prevent a negative impact on performance. In some implementations, a fuzzy logic engine can be used to determine the appropriate adjustments to make to the computing resources associated with a program in order to keep a system metric within a desired operating range.

20 Claims, 7 Drawing Sheets

Related U.S. Application Data continuation of application No. 13/253,842, filed on Oct. 5, 2011, now Pat. No. 8,856,797.

(56) References Cited

U.S. PATENT DOCUMENTS

| | | |
|---|---|---|
| 7,610,214 B1 | 10/2009 | Dwarakanath et al. |
| 7,721,292 B2 | 5/2010 | Frasier et al. |
| 7,739,143 B1 | 6/2010 | Dwarakanath et al. |
| 8,499,066 B1 | 7/2013 | Zhang et al. |
| 8,856,797 B1 | 10/2014 | Siddiqui et al. |
| 2008/0022284 A1 | 1/2008 | Cherkasova et al. |
| 2008/0273591 A1 | 11/2008 | Brooks et al. |
| 2015/0026348 A1 | 1/2015 | Siddiqui et al. |

REACTIVE AUTO-SCALING OF CAPACITY

CROSS-REFERENCE TO RELATED APPLICATIONS

This application is a continuation of U.S. patent application Ser. No. 14/506,453, filed Oct. 3, 2014, titled "REACTIVE AUTO-SCALING OF CAPACITY," which is a continuation of U.S. patent application Ser. No. 13/253,842, filed Oct. 5, 2011, titled "REACTIVE AUTO-SCALING OF CAPACITY," now U.S. Pat. No. 8,856,797, each of which is hereby incorporated by reference herein in its entirety.

BACKGROUND

Companies and organizations operate computer networks that interconnect numerous computing systems to support their operations. The computing systems can be located in a single geographical location (e.g., as part of a local network) or located in multiple distinct geographical locations (e.g., connected via one or more private or public intermediate networks). Data centers may house significant numbers of interconnected computing systems, such as, e.g., private data centers are operated by a single organization and public data centers operated by third parties to provide computing resources to customers. Public and private data centers may provide network access, power, hardware resources (e.g., computing and storage), and secure installation facilities for hardware owned by the data center, an organization, or by other customers.

To facilitate increased utilization of data center resources, virtualization technologies may allow a single physical computing machine to host one or more instances of virtual machines that appear and operate as independent computer machines to a connected computer user. With virtualization, the single physical computing device can create, maintain or delete virtual machines in a dynamic manner. In turn, users can request computer resources from a data center and be provided with varying numbers of virtual machine resources on an "as needed" basis or at least on an "as requested" basis.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

As the scale and scope of data centers has increased, the task of provisioning, administering, and managing the physical and virtual computing resources of the data center has become increasingly challenging. Modern programs and distributed systems can require rapid scaling to avoid unacceptable performance degradation and the corresponding negative user experience. One problem, among others, is that it is often difficult to predict when such scaling will be necessary and the magnitude of scaling that will be required to prevent the performance issue.

Therefore, embodiments of systems and methods are described for managing computing capacity associated with a program or set of programs. Illustratively, computing resources associated with a program may include program execution capabilities, data storage or management capabilities, network bandwidth, etc. In some implementations, one or more program owners can use a computing resource provider to host their programs. One or more program users can then use the computing resource provider to access those programs. Computing resource needs can be specified by a program owner, or they may be forecasted based on past usage and other factors. A desired operating range may also be specified by a program owner, or may be calculated by the computing resource provider. When the computing resource provider observes that a program requires additional or fewer resources to perform within the desired operating range, some portion of computing resources can be associated with or disassociate from the program. In some embodiments, the computing resources associated with a program may not exceed a forecasted upper threshold or fall below a forecasted lower threshold.

For example, the release of a new movie on a video streaming service may require additional network bandwidth and program execution capabilities. Periods of increased demand can be specified by the program owner or forecasted by the computing resource provider. The computing resource provider can increase the computing resources associated with the video streaming service based on the forecast and any observed increase in computing resource usage. The release date, computing resource requirements, and/or other parameters of the forecasted event may be specified with a high degree of flexibility to meet the video streaming service's need for computer resources. The forecast may be optimized by various techniques, including manual overrides and machine learning algorithms. In certain fee-based implementations, the computing resource provider may charge a fee to the program owner based on the amount of computing resources associated with the program and the duration for which they are associated with the program. In these implementations, being able to add and remove computing resources based on actual need can provide value to the program owners and free up computing resources that can be more effectively used by other programs.

The pool of computing resources can include, for example, dozens, hundreds or thousands of computing nodes. A capacity manager can monitor the computing resources and applications associated with the computing resources over time intervals ranging from milliseconds to hours or longer. When computing resources are scaled up, the average time it takes for additional computing resources to be associated with an application, e.g., the mean time to traffic, can be a few (e.g., 2-3) minutes to an hour or more for various implementations. Certain embodiments of the systems and methods disclosed herein can provide reactive auto-scaling of computing capacity substantially in real time (for example, on time scales comparable to the mean time to traffic).

Various aspects of the disclosure will now be described with regard to certain examples and embodiments, which are intended to illustrate but not to limit the disclosure.

Example Systems Providing Reactive Auto-Scaling of Computing Capacity

Figure 1:
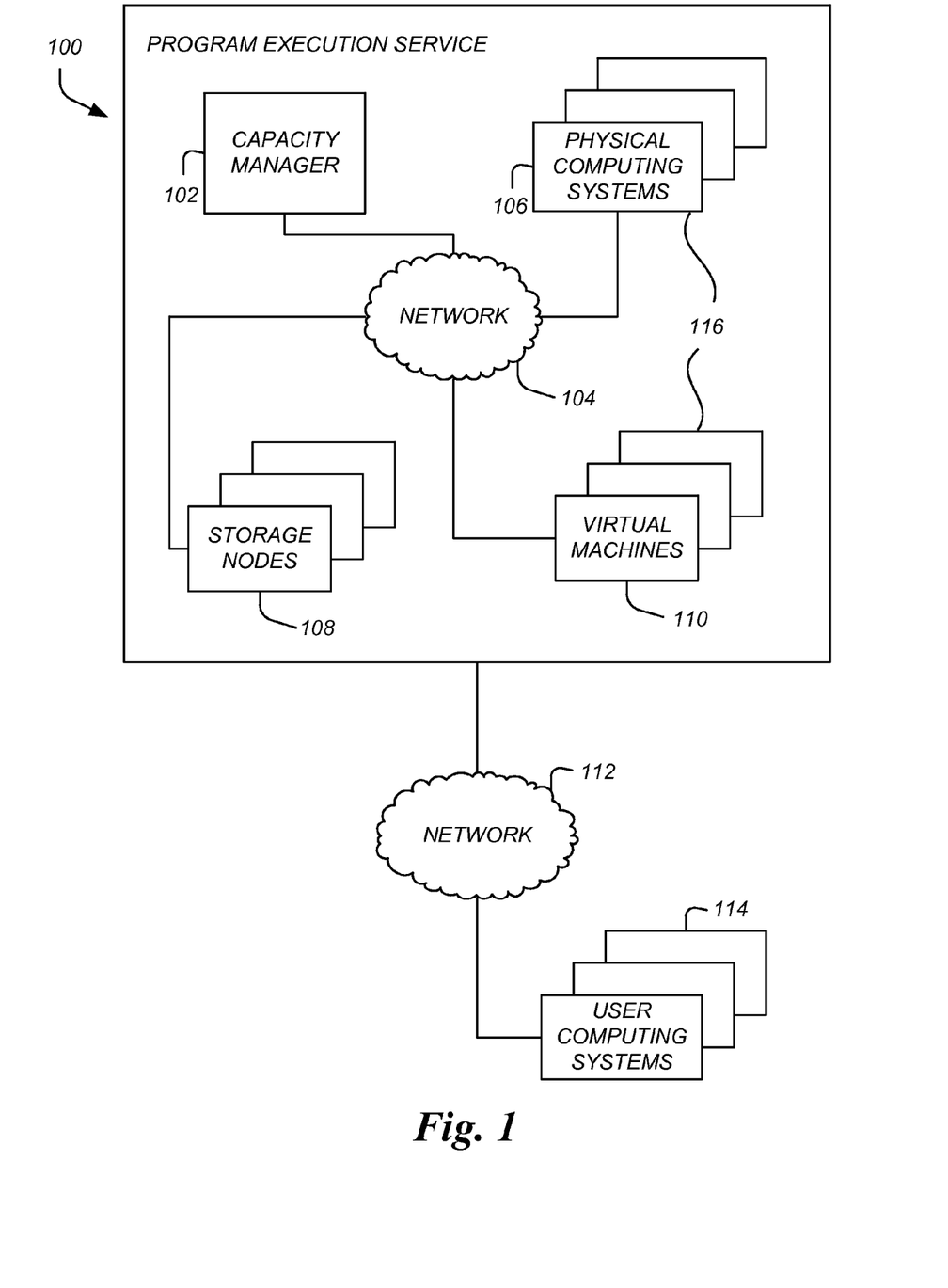
FIG. 1 is a network diagram schematically illustrating an example of a program execution service that can provide computing resources to multiple user computing systems via a communication network.

FIG. 1 is a network diagram schematically illustrating an example of a program execution service 100 that can provide computing resources to multiple user computing systems 114 via a communication network 112. For example, the program execution service 100 can manage requests from a program user to execute a program, or set of programs, on behalf of the program user. The program, or set of programs, can originate from a program owner who uses the program execution service 100 to host the program so that users may access the program on user computing systems 114. Users of the program execution service 100 can interact with the program execution service 100 via a capacity manager 102 to request preferred and/or required resources of the program execution service (e.g., program execution capacity and/or storage resources). The capacity manager 102 can also monitor demand for or utilization of computing resources on the program execution service 100 and automatically scale (e.g., "auto-scale") the computing resources in response to changes in demand or utilization. As will be further described herein, the capacity manager 102 may implement various processes and algorithms for reactively auto-scaling the computing resources to attempt to keep a desired computing metric (e.g., average CPU utilization) within a desired band or range while keeping the computing resources above (or below) a threshold.

Some user computing systems 114 can be remote from the program execution service 100. In this example, users can use the computing systems 114 to access the program execution service 100 over the communication network 112. In some embodiments, the user computing systems 114 may include any of a number of computing devices that are capable of communicating over a communication network 112 including, but not limited to, a laptop, personal computer, personal digital assistant (PDA), hybrid PDA/mobile phone, mobile phone, electronic book reader, digital media player, tablet, etc.

The communication network 112 may, for example, be a publicly accessible network of linked networks, possibly operated by various distinct parties, such as the Internet. In other embodiments, the network 112 may be a private network, such as, for example, a corporate or university network that is wholly or partially inaccessible to non-privileged users. In still other embodiments, the network 112 may include a private network, personal area network, local area network, wide area network, cable network, satellite network, cellular telephone network, etc. or combination thereof, each with access to and/or from the Internet.

The program execution service 100 provides a variety of functionality for managing execution of programs for multiple users. In the example illustrated in FIG. 1, the program execution service 100 comprises a plurality of computing nodes 116 that can execute programs on behalf of the users. The computing nodes 116 may comprise one or more physical computing systems 106 and/or one or more virtual machines 110 that are hosted on one or more physical computing systems. For example, a host computing system may provide multiple virtual machines 110 and include a virtual machine ("VM") manager to manage those virtual machines (e.g., a hypervisor or other virtual machine monitor). In some embodiments, the computing nodes 116 may be located in a different geographical location than the capacity manager 102, data nodes 108, etc. In still further embodiments, some or all of the computing nodes 116 may be located in different geographical locations from each other.

In the example illustrated in FIG. 1, each of the computing nodes 116 has some amount of computing resources available for executing one or more programs. Each computing node 116 may be configured to provide a specific amount of program execution capacity, which may be measured, for example, by a combination of one or more of processing capacity (e.g., number and/or size of processing units), memory capacity, storage capacity, network bandwidth capacity, non-network communication bandwidth, etc. In some embodiments, the program execution service 100 may provide preconfigured computing nodes 116, with each preconfigured computing node having similar and/or equivalent amounts of resources available for executing programs on behalf of users. In other embodiments, the program execution service 100 may provide a selection of various different computing nodes 116 from which a program owner may choose for executing programs on behalf of the user. In some such embodiments, the computing nodes 116 may have varying amounts and/or types of computing resources (e.g., size, speed and/or type of processing units; number of processing units; amount of memory and/or storage; platform configuration, such as 32-bit or 64-bit, operating system, etc.).

The program execution service 100 may provide user computing systems 114 with access to storage nodes 108 that provide mass storage of data, programs, and other user information. The storage nodes 108 may comprise any type of persistent data storage, for example non-volatile memory devices such as, e.g., hard disk drives, optical disk drives, etc. In the example illustrated in FIG. 1, the computing nodes 116 can access the storage nodes 108 via a network 104. The network 104 may include multiple networking devices (not shown) such as, e.g., switches, edge routers, core routers, etc. The network 104 may, but need not be, a different network than the network 112 shown in FIG. 1.

In some embodiments, the capacity manager 102 is executed or embodied by one or more physical or virtual computing systems. For example, in some embodiments, a server computing system that has components including a central processing unit (CPU), input/output (I/O) components, storage, and memory may be used to execute the capacity manager 102. The I/O components include a display, a network connection to the network 128, a computer-readable media drive, and other I/O devices (e.g., a keyboard, a mouse, speakers, etc.). An embodiment of the capacity manager 102 can be stored as one or more executable program modules in the memory of the server, and the capacity manager 102 can interact with computing nodes 116 (e.g., physical computing systems 106 and/or virtual machines 110) over the network 104.

In operation, users of the program execution service 100 can interact with one or more programs running on any number of computing nodes 116. Interaction between user computing systems 114 and the program execution service 100 can occur over the network 112. The program execution service 100 shields users from the details of which computing node 116 a user is actually communicating with. In some embodiments, a user may communicate with a different computing node 116 each time a request or other communication is made. The capacity manager 102 can monitor various one or more system metrics of the programs, computing nodes 116, storage nodes 108, network 104, etc. The system metrics can represent the current operating state of the program, such as CPU utilization, memory utilization, network bandwidth, whether computing resources assigned to the program are able to be reached (e.g., are available or accessible over a network), etc. The system metrics can cover all or only a part of the computing resources associated with a program. For example, some computing resources can be physically grouped based on geographic location, and therefore system metrics indicating how the computing resource is performing in various geographic locations can be provided. System metrics can also be program metrics, such as measurements of how the program is interacting with end users, including the number of transactions over a period of time, number of requests over a period of time, number of end users accessing the program at a point in time, how long the program has been running, other measures of externally (or internally) facing traffic to computing nodes or the program execution service, etc. When the capacity manager 102 determines that current usage of a computing resource requires an adjustment, the capacity manager 102 can add or remove resources to bring the system metric back within a desired operating range. In some cases, there may be (at least temporarily) insufficient resources to bring the system metric within the desired operating range. In some such cases, the capacity manager 102 can communicate a request to a system manager for acquisition of sufficient additional resources (e.g., by purchasing or acquiring computing systems or storage nodes for the program execution service).

For example, the capacity manager 102 can monitor the CPU utilization of the computing nodes 116 that are hosting a program. The CPU utilization may represent an average, mean, median, maximum, minimum, or some other statistical measure of the CPU utilization of some or all of the computing nodes hosting the program. When a measurement of the CPU utilization is above a desired range, the capacity manager 102 can assign additional computing nodes 116 to host the program. Such an adjustment can be made before the CPU utilization approaches 100%. Conversely, when a measurement of the CPU utilization is below a desired range, the capacity manager 102 can remove computing nodes 116 that host the program. Such an adjustment can be made before the CPU utilization approaches 0%. Users operating user computing systems 114 may be entirely unaware that the computing resources assigned to the program they are using have been scaled to improve their user experience, because the resources have been scaled before a noticeable degradation of performance occurs. In some embodiments, the desired operating range for a system metric can vary depending on the time of day, day of the week, or other factors. For example, the desired operating range for CPU utilization can be lower during nighttime hours, when system maintenance and deployments typically occur. In such cases, it can be desirable to maintain the CPU utilization percentage at a lower level so that there is not a sudden spike in the CPU utilization during CPU-intensive maintenance that adversely affects users operating user computing systems 114.

Figure 2A:
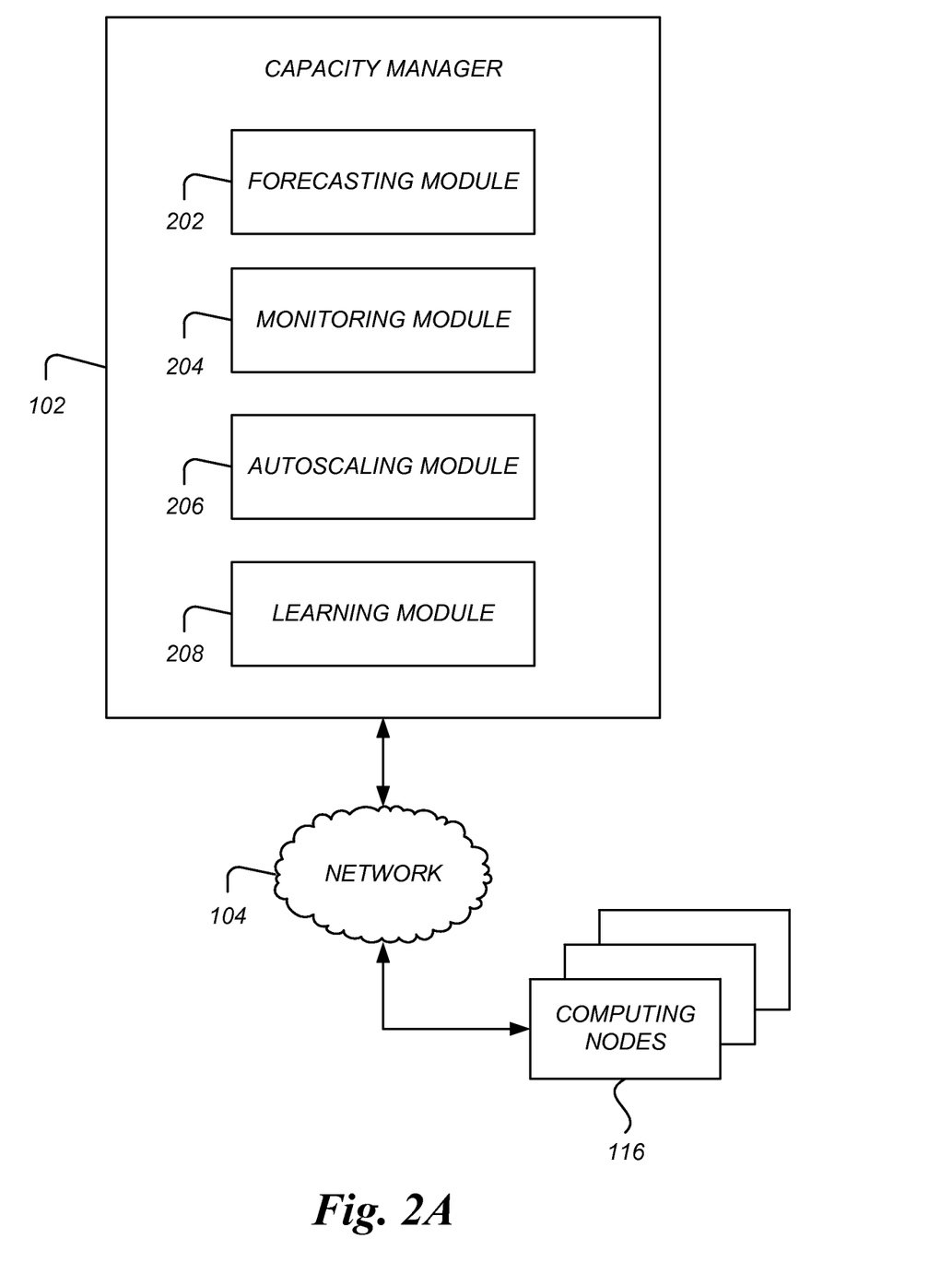
FIG. 2A is a block diagram schematic of illustrative components of a capacity manager configured to manage computing resources for programs in a program execution service.

FIG. 2A is a block diagram schematic of illustrative components of an embodiment of the capacity manager 102 that is configured for managing execution of programs on behalf of users. In this embodiment, the capacity manager 102 includes a forecasting module 202, a monitoring module 204, an autoscaling module 206, and a learning module 208. The components can all be located on a single physical or virtual computing system. In some embodiments, the components can be located on any number of physical or virtual computing systems in a distributed computing environment. The capacity manager 102 can communicate with computing nodes 116. As described above with respect to FIG. 1, this communication can occur over a network 104.

The forecasting module 202 can determine the future demand for one or more computing resources. In some embodiments, the forecasting module 202 can predict the future demand of a computing resource, and can use that prediction to set upper and lower thresholds on the quantity of the computing resource that may be associated with a program. The upper and lower thresholds help to keep a system metric, such as CPU utilization percentage, within a desired operating range. The desired operating range may include a lower bound, an upper bound, and/or a target system state. The desired operating range may include or be based at least in part on other parameters such as, e.g., a time period for when the range is to be applied (e.g., during the day, night, or weekends), geographic information (e.g., the range applies for computing resources located in a particular computing center or geographic area), pricing goals (e.g., certain thresholds may be apply only if the cost of additional resources is below a cost value), or other goals or objectives of a user.

The prediction provided by the forecasting module 202 can be based at least in part on historical data about metric. Using that prediction, the forecasting module 202 can determine lower and/or upper thresholds for the number of computing nodes 116 to assign to a program. As one illustrative example, an online retailer may have a program hosted by the program execution service 100, and may typically have, for example, 500 computing nodes 116 associated with the program. During certain holiday seasons, the online retailer's program can experience a substantial increase in traffic. The forecasting module 202 can predict that the demand for computing nodes 116 may, for example, triple during those holiday seasons. The forecasting module can set a lower threshold of twice the usual computing nodes 116 (e.g., 1000 computing nodes), which advantageously may reduce or prevent the likelihood that the number of computing nodes 116 assigned to the program will fall so low that the program execution service 100 will not be able to handle the demand for computing resources that has been forecasted for that time period. The thresholds can also reduce or prevent the likelihood that the number of computing nodes 116 assigned to a program will increase such that the program execution service 100 will not have sufficient resources to assign to other programs. The upper threshold can be set manually, in some cases, to reduce or prevent the likelihood that the program owner or user is charged for more computing capacity than it has budgeted for.

The forecasting module 202 can use one or more forecasting algorithms algorithm to predict future capacity requirements. For example, the forecasting module 202 can utilize moving averages, exponential smoothing, autoregressive models, Holt-Winters seasonal or double seasonal methods, etc. In another example, the forecasting module can utilize embodiments of a Z-model algorithm, for example as described in commonly owned U.S. patent application Ser. No. 12/961,285 titled "Predicting Long-Term Computing Resource Usage" filed Dec. 6, 2010 and incorporated herein in its entirety by reference.

The monitoring module 204 can monitor a system metric that is indicative of the current state of the program. The monitoring module 204 can forward the system metric to the autoscaling module 206 for a determination of whether the computing resources assigned to the execution of a program require adjustment. For example, the monitoring module 204 can monitor the CPU utilization of the computing nodes 116 assigned to a program. The monitoring module 204 can issue an electronic notification to the autoscaling module 206 (or some other component of the capacity manager or program execution service, or to a system manager or user), notifying it of the actual measurement of the system metric. In some embodiments, the monitoring module 204 can be configured to determine when the system metric is outside the desired operating range (or passes one or more bounds), and then to issue a notification to the autoscaling module 206 so that an adjustment can be made.

The autoscaling module 206 can adjust the computing resources assigned to the execution of a program based at least in part on the system metric received from the monitoring module 204. When the autoscaling module 206 receives such a notification, it can first determine whether the system metric is outside the desired operating range. The autoscaling module 206 can then use adjustment rules to determine an adjustment to make to a computing resource in order to bring the system metric back within the desired operating range. Adjustment rules can be rules that indicate which adjustment to make in order to bring a certain system metric back within a certain desired operating range. Adjustment rules can also be used to dynamically calculate the necessary adjustments, based on a variety of factors including, but not limited to, the system metric, the date and/or time, the properties of the program being executed, and other environmental factors. The autoscaling module can include a fuzzy logic engine to aid in the application of adjustment rules. In such a case, the adjustment rules can correspond to the bands that a fuzzy logic engine uses in operation. In some embodiments, the autoscaling module 206 can use a proportional-integral-derivative (PID) controller to aid in the application of the adjustment rules. In some embodiments, the autoscaling module 206 can refer to a table or other data store that contains the adjustment rules. The autoscaling module 206 may use multiple control engines to apply the adjustment rules to attempt to keep the monitored system metric within the desired operating range.

When the amount of the adjustment to be made has been determined, the autoscaling module 206 can then initiate the adjustment. In one example, the monitored system metric is CPU utilization and the monitoring module 204 issues a notification to the autoscaling module 204, including the measurement of the system metric. The autoscaling module 206 determines whether the CPU utilization is outside the desired operating range. The autoscaling module 206 then determines that the adjustment to make in order to bring the CPU utilization back into the desired operating range is to associate more computing nodes 116 to execute the program. The autoscaling module 206 can be configured to associate the additional computing nodes 116 to the program. In some embodiments, the autoscaling module 206 can issue a notification to another component that carries out the implementation of the adjustment.

The learning module 208 can update the adjustment rules that the autoscaling module 206 uses to determine necessary adjustments to the computing resources assigned to a program. The learning module 208 can utilize a feedback loop to determine the updates to make to the adjustment rules based on the effect that an adjustment initiated by the autoscaling module 206 has on the monitored system metric. When the autoscaling module 206 makes an adjustment to a computing resource, the learning module 208 monitors the system metric to determine whether the adjustment was successful in bringing the system metric back within the desired operating range. If the system metric remains outside the desired operating range, the learning module 208 can update the adjustment rules to fine tune the future operation of the autoscaling module 206.

In some embodiments, the learning module 208 can be invoked by the autoscaling module 206 when the autoscaling module 206 has initiated an adjustment. In such a case, the autoscaling module 206 can send information to the learning module 208, including which system metric to monitor, which program to monitor, what adjustment was made, etc. In some embodiments, the learning module 208 can be in communication with the monitoring module 204, and receive updated system metrics from the monitoring module 204. In some embodiments, the learning module 208 can be integrated into the monitoring module 204, or into the autoscaling module 206, to facilitate efficiency of operation.

In one illustrative example, the monitoring module 204 detects that the CPU utilization of the computing nodes 116 associated with a program is 90%, and notifies the autoscaling module 206. The autoscaling module 206 determines that the system metric is outside the desired operating range of 40%-60%. The autoscaling module 206 determines that the appropriate adjustment to make is to associate 10 new computing nodes 116 with the program, bringing the total number of computing nodes 116 associated with the program to 50, which is inside the maximum threshold of 75, as set by the forecasting module 202. The autoscaling module 206 associates the 10 additional computing nodes with the program, and the learning module 208 monitors subsequent measurements of the CPU utilization of the computing nodes 116. The next measurement of the CPU utilization of the computing nodes 116 is 65%, which is still outside the desired operating range of 40%-60%. Thus, in this example, the association of 10 additional computing nodes to reduce CPU utilization by 30% (e.g., from 90% to the upper limit of 60%) was insufficient, because the actual, monitored CPU utilization decreased only to 65% rather than 60%. The learning module 208 can update the adjustment rules so that the next time the autoscaling module 206 determines the appropriate adjustment, it may associate, for example, 15 additional computing nodes 116 when the CPU utilization is 30% higher than the desired operating range. In another example based on the same illustrative preliminary events, a subsequent measurement of CPU utilization as monitored by the learning module 208 is 35%, which is below the desired operating range of 40%-60%. In such a case, the learning module 208 can update the adjustment rules so that the next time the autoscaling module 206 determines the appropriate adjustment, it may associate, for example, only 5 additional computing nodes 116 when the CPU utilization is 30% higher than the desired operating range. The foregoing examples are intended to illustrate how the modules of the capacity manager 102 may interact and are not intended to be limiting.

In some embodiments, the learning module 208 can update the adjustment rules by using a percentage instead of an absolute number. In some embodiments, the learning module 208 can update the adjustment rules by considering environmental factors beyond the system metric, including date, time of day, and other system metrics such as memory utilization, network utilization, or combinations of system metrics, etc. In some embodiments, the learning module 208 can utilize machine learning techniques to update the adjustment rules. In other embodiments, the learning module 208 can receive manual overrides from a user or system administrator to apply to the adjustment rules. In still other embodiments, the learning module 208 can combine two or more of these methods to update the adjustment rules.

The capacity manager 102 can be configured differently than illustrated in FIG. 2A. For example, various functionalities provided by the illustrated modules can be combined, rearranged, added, or deleted. In some embodiments, additional or different processors or modules may perform some or all of the functionalities described with reference to the example embodiment illustrated in FIG. 2A. Many implementation variations are possible.

Although described generally in terms of management of program execution capacity, in other embodiments, the capacity manager 102 can be configured to manage additional or alternative types of computing-related resources for use by multiple programs. These resources may include one or more of the following: persistent data storage capabilities (e.g., on non-volatile memory devices, such as hard disk drives); temporary data storage capabilities (e.g., on volatile memory, such as RAM); message queuing and/or passing capabilities; other types of communication capabilities (e.g., network sockets, virtual communication circuits, etc.); database management capabilities; dedicated bandwidth or other network-related resources; non-network bandwidth; input device capabilities; output device capabilities; CPU cycles or other instruction execution capabilities; etc.

Figure 2B:
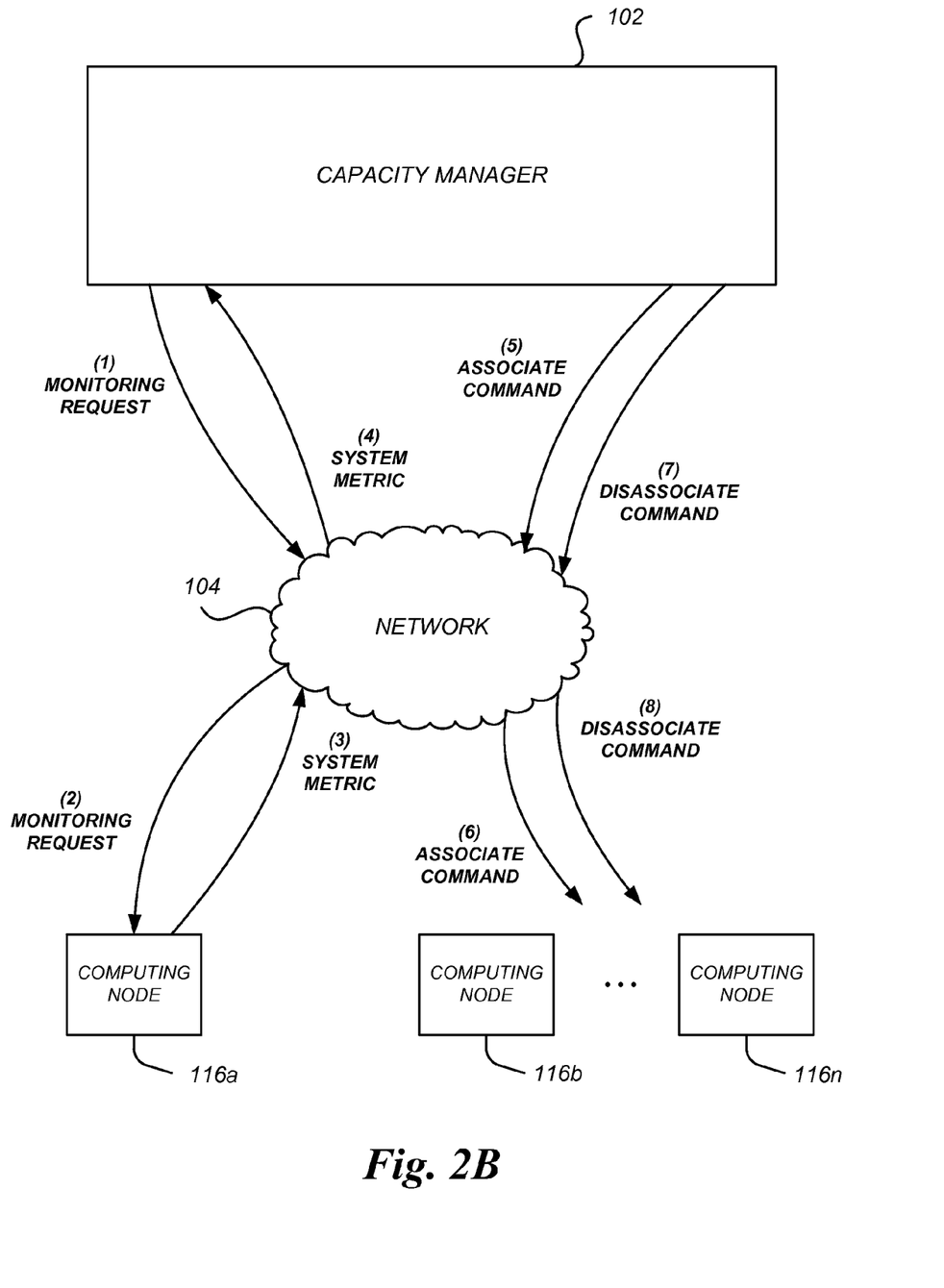
FIG. 2B is a network diagram schematically illustrating an example interaction between a capacity manager and several computing nodes in a program execution service.

FIG. 2B is a network diagram schematically illustrating an example interaction between a fleet of computing nodes 116a, 116b, . . . , 116n and a capacity manager 102 of a program execution service 100. In this illustrative example, the program execution service 100 provides several APIs for the capacity manager 102 to programmatically interact with computing nodes 116a, 116b, . . . , 116n. FIG. 2B illustratively shows the capacity manager 102 communicating a request for a measurement of a system metric through a monitoring API. A monitoring request (1) is initiated by the capacity manager 102 and communicated via the network 104. The monitoring request (2) is finally received by the computing node 116a. The monitoring request (1), (2) can include information about the program to be monitored, because each computing node 116a, 116b, . . . , 116n can be configured to host several different programs. The monitoring request (1), (2) can include other information, such as the system metric to be measured, the time period over which to sample the metric, the urgency of the monitoring request, etc. After receipt of the monitoring request (2), the computing node 116a can use the information contained therein to measure the appropriate system metric and return the requested information to the capacity manager 102 through the monitoring API. In the example shown in FIG. 2B, the computing node 116a communicates a system metric (3) via the network 104. The system metric (4) received by the capacity manager 102. The system metric can include information related to the time the measurement was taken and other environmental data.

FIG. 2B illustratively shows the capacity manager 102 programmatically interacting via an association API with the computing nodes 116b, . . . , 116n of the program execution service 100. As described above, if the capacity manager 102 determines that a system metric is outside the desired operating range, for example if the CPU utilization of computing node 116a has exceeded top end of the desired operating range, the capacity manager 102 can associate additional computing nodes 116b, . . . , 116n with the program in order to bring the system metric back within the desired operating range. In some embodiments, the capacity manager 102 associates additional computing nodes 116b, . . . , 116n by allocating them from a pool of available computing nodes 116b, . . . , 116n, or from another program. In some embodiments, the computing node 116a that receives the monitoring request (1) and transmits the system metric (3) can be a different type of computing resource than the computing nodes 116b, . . . , 116n that are associated with program. For example, the computing node 116a can perform the administrative functions of a distributed program, such as monitoring system metrics of the various computing resources associated with the program. In such a configuration, the computing nodes 116b, . . . , 116n that are associated with the program can add CPU capability, memory, network bandwidth, or other computing resources that the computing node 116a does not provide to the program. Using the association API, the capacity manager 102 sends an associate command (5) through the network 104. The associate command (6) can be received by each computing node 116b, . . . , 116n through the association API. The associate command (5), (6) can include information about the program that the computing nodes 116b, . . . , 116n are to execute. For example, the associate command (5), (6) can include a unique identifier corresponding to the program, a location from which to obtain a copy of the program, an image containing the program, or other information that the receiving computing node can use to install, load, or otherwise begin execution of the proper program.

In some embodiments, the computing nodes 116b, . . . , 116n can be configured to send confirmation messages back to the capacity manager through a confirmation API (not shown). The confirmation messages can be sent at various times, such as when the computing node receives an associate command or when the computing node successfully begins execution of the program. The confirmation message can include information about when the computing node received the associate command from the capacity manager 102, how long the computing node took to load and begin execution of the program, etc.

If the capacity manager 102 determines that the CPU utilization of computing nodes 116a, 116b, . . . , 116n is outside the desired operating range, the capacity manager 102 can disassociate a subset of computing nodes 116b, . . . , 116n from the program through a disassociation API. As described above, if the capacity manager 102 determines that a system metric is outside the desired operating range, for example if the CPU utilization of computing nodes 116a, 116b, . . . , 116n has fallen below the lower bound of the desired operating range, the capacity manager 102 can disassociate computing nodes 116b, . . . , 116n from the program in order to bring the system metric back within the desired operating range. In some embodiments, the capacity manager 102 disassociates computing nodes 116b, . . . , 116n by deallocating them from the program and returning them to another program or to a pool of available computing nodes 116b, . . . , 116n. Using the disassociation API, the capacity manager 102 sends a disassociate command (7) through the network 104. The disassociate command (8) can be received by each computing node 116b, . . . , 116n through the disassociation API. The disassociate command (7), (8) can include information about the program that the computing nodes 116b, . . . , 116n are to stop executing. For example, the disassociate command (7), (8) can include a unique identifier corresponding to the program or other information that the receiving computing node can use to determine which program to terminate execution of out of the several programs it may be currently executing.

In some embodiments, the computing nodes 116b, . . . , 116n can be configured to send confirmation messages back to the capacity manager through a confirmation API (not shown). The confirmation messages can be sent at various times, such as when the computing node receives a disassociate command or when the computing node successfully ends execution of the program. The confirmation message can include information about when the computing node received the disassociate command from the capacity manager 102, how long the computing node took to terminate execution of the program, etc.

Figure 3A:
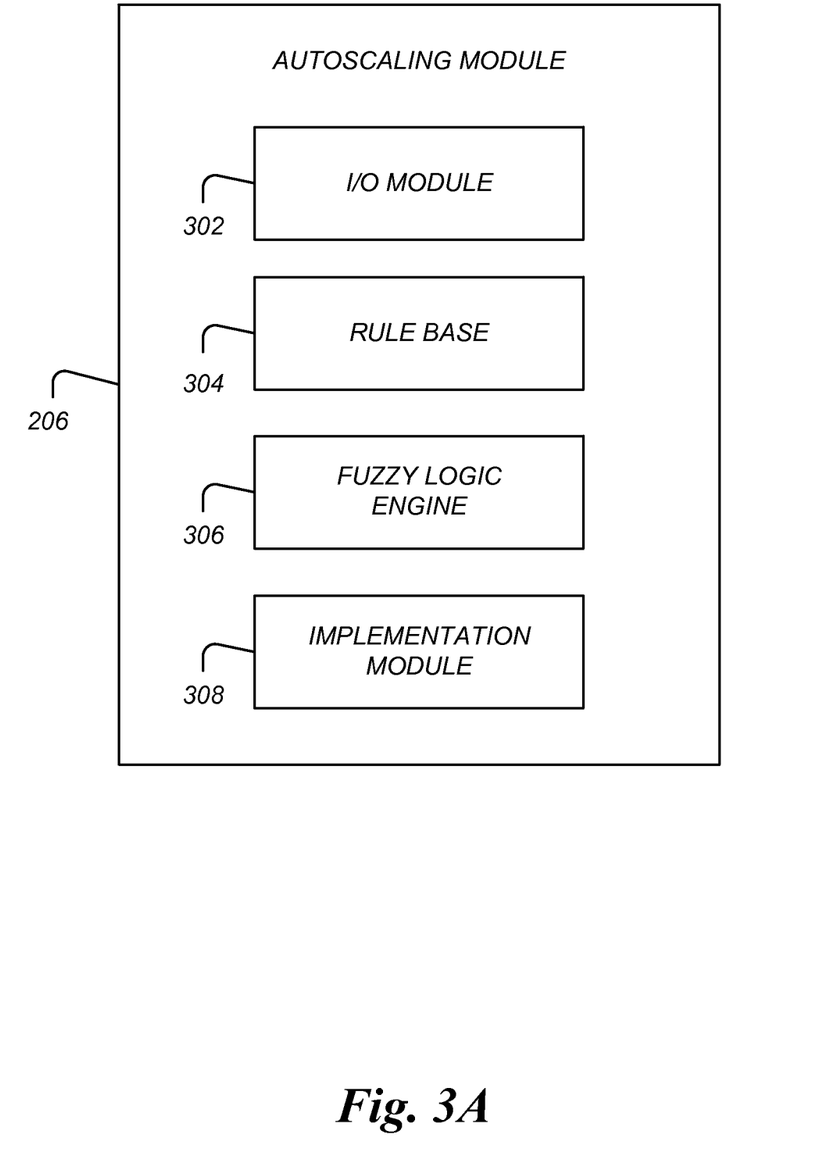
FIG. 3A is a block diagram schematic of illustrative components of an autoscaling module configured to adjust computing resources for programs in a program execution service.

FIG. 3A is a block diagram schematic of illustrative components of an embodiment of the autoscaling module 206 that is configured for determining adjustments to the collection of computing nodes 116 executing programs on behalf of users. In this embodiment, the autoscaling module 206 includes an I/O module 302, a rule base 304, a fuzzy logic engine 306, and an implementation module 308. The components can be located on a single physical or virtual computing system. In some embodiments, the components can be located on any number of physical or virtual computing systems in a distributed computing environment.

The I/O module 302 can be configured to send and receive electronic messages over a network, such as the network 104 of the program execution service 100. In some embodiments, the I/O module 302 can be configured to communicate with other modules of a capacity manager 102, such as a forecast module 202, a monitoring module 204, and a learning module 208. If one or more of those modules resides on the same physical machine as the autoscaling module 206, the communication can occur over an internal bus. If one or more of those modules resides on a different physical machine, the communication can occur over a network, such as the network 104 of the program execution service 100.

The rule base 304 can store adjustment rules, capacity bands, upper and lower thresholds, and other information used by the fuzzy logic engine 306. Adjustment rules can contain information related to the amount of adjustment to make to a computing resource in order to bring a system metric within a desired operating range. Capacity bands can be used by the fuzzy logic engine 306 during its calculations. Upper and lower thresholds may apply to any adjustment, and can be received from the forecast module 202 of the capacity manager 102. The rule base 304 can also be updated with new adjustment rules as part of the feedback mechanism controlled by the learning module 208 of the capacity manager 102, as described in detail above.

The fuzzy logic engine 306 can be configured to receive a system metric from the I/O module 302, receive adjustment rules from the rule base 304, and to determine an appropriate adjustment to make to a computing resource. The implementation module 308 can be configured to receive the adjustment from the fuzzy logic engine 306 and then implement the adjustment by associating or disassociating computing resources, as described above with respect to FIG. 2A. In some embodiments, the fuzzy logic engine 306 can be configured to determine the adjustment as a recommendation. Rather than being implemented, the recommended adjustment can be communicated to an end user or system administrator to aid the administration and execution of the program.

In one example, described in detail below with respect to FIGS. 3B and 3C, the I/O module 302 can receive a system metric from the monitoring module 204 of the capacity manager 102, such as a CPU utilization of 30%. The I/O module 302 can route the system metric to the fuzzy logic engine 306. The fuzzy logic engine 306 can load thresholds, capacity bands, and adjustments rules from the rule base 304. The fuzzy logic engine 306 can be configured to operate on this data as described in detail below, in order to determine an appropriate adjustment to a computing resource in order to bring the system metric within the desired operating range. In this example, the fuzzy logic engine 304 can determine that the appropriate adjustment to be made is to disassociate 10 computing nodes from the program. The fuzzy logic engine 306 can communicate this adjustment to the implementation module 308. The implementation module 308 can then disassociate 10 computing nodes 116 from the program by sending disassociate commands to the 10 computing nodes 116, as described above. In some embodiments, a PID controller can be used in addition to, or alternatively to, the fuzzy logic engine 306. The PID controller can, receive system metrics and calculate appropriate adjustments to make to a computing resource in order to bring the system metric within the desired operating range.

Example Methods for Providing Reactive Auto-Scaling of Computing Capacity

Figure 3B:
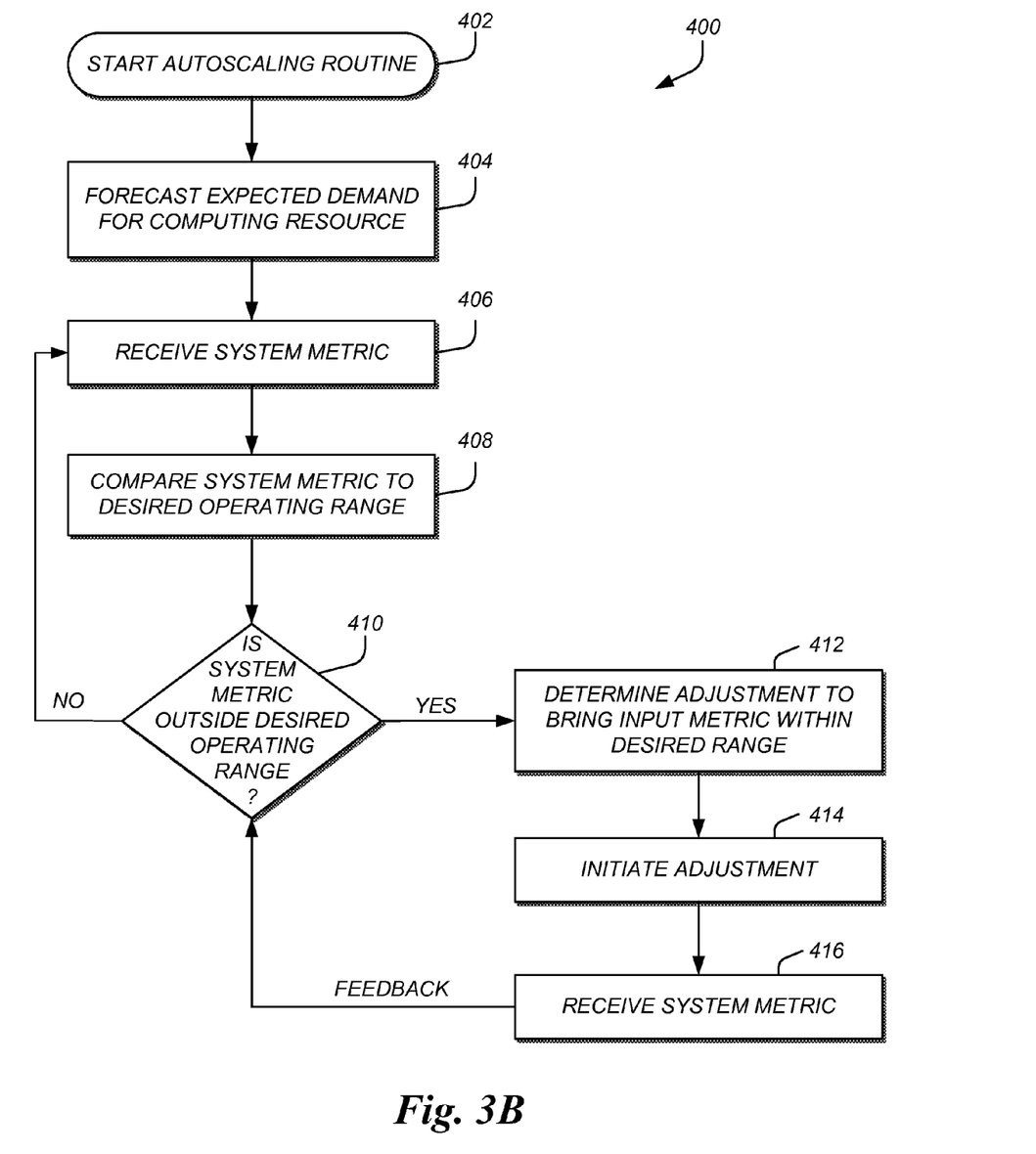
FIG. 3B is a flow diagram illustrating an example of a fuzzy logic routine that can be implemented by a fuzzy logic engine of a capacity manager.

FIG. 3B is a flow diagram that illustrates an example embodiment of an autoscaling routine 400. In some implementations, the routine 400 can be provided by embodiments of the fuzzy logic engine 306 of the capacity manager 102, described herein. The example routine 400 is described in terms of a system metric that indicates an operating state of a program, and the parameters that the routine 400 bases its calculations on, e.g., capacity bands, adjustment rules, lower and/or upper thresholds, and the like. In this example, a number of computing nodes 116 in a program execution service 100 are executing a program. A capacity manager 102 is being used to maintain the CPU utilization of the computing nodes 116 within a desired operating range. The fuzzy logic engine 306 analyzes the system metric and determines if, when, and by how much to adjust the number of computing nodes 116 assigned to execute the program. The example routine 400 is intended to illustrate, but not to limit, various aspects of the fuzzy logic engine 306 of the capacity manager 102.

With reference to FIG. 3B, at block 402 the auto scaling routine 400 is initialized. In one example, a fuzzy logic engine 306 is implemented in software executing on a computing device, such as a server. When the autoscaling routine 400 is initialized and receives a system metric, the fuzzy logic engine 306 can load various operating parameters into its memory space on the server. These operating parameters can come from the rule base 304, and can include the capacity bands to be used in block 410, the adjustment rules to be used in block 410, the lower and/or upper thresholds to be considered in block 410, the computing resources to adjust in block 412, etc. In this illustrative example, the desired operating range is 60%-70% CPU utilization. The computing resources to be adjusted are the number of computing nodes 116 in the program execution service 100 associated with the program. The upper threshold for the total number of computing nodes in the program execution service 100 to be associated with the program at the time in question is 600, and the lower threshold is 100. In some embodiments, the thresholds are determined during execution of the autoscaling routine 400. When this is the case, the routine 400 proceeds to block 404. If the thresholds are determined by a separate process, the routine will proceed to block 406.

At block 404, the forecasting module 202 can forecast the expected demand for one or more computing resources associated with an application. As described herein, the forecasting module 202 can use that forecast to determine upper and/or lower thresholds for the quantity of the computing resource to be associated with the program at various times. When the thresholds have been determined, the routine 400 can proceed to block 406. In some embodiments, the determination of upper and/or lower thresholds can be performed by a separate process that invokes the forecasting module 202, and in such cases the upper and/or lower thresholds can be retrieved from the rule base 304 during initialization of the routine 400, as described with respect to block 402.

At block 406, a system metric is received by the fuzzy logic engine 306. As described above, the system metric can initially come from a program and initially be received by a monitoring component 202 of the capacity manager 102. The monitoring component 202 can then communicate the system metric to the fuzzy logic engine 306 for processing. In this example, the fuzzy logic engine 306 receives a system metric indicating that the CPU utilization of the computing nodes 116 that are currently executing a program is 20%. The fuzzy logic engine 306 is being invoked to analyze the CPU utilization and to determine whether additional or fewer computing nodes 116 in the program execution service 100 should be associated with the program.

At block 408, the fuzzy logic engine 306 compares the system metric received in block 406 to the desired operating range. The desired operating range can vary based on the date, time of day, special events, user-entered overrides, feedback loops, machine learning algorithms, etc. In this case, the CPU utilization is 20%, and the desired operating range is 60%-70%.

At decision block 410, the fuzzy logic engine 306 determines whether the system metric is outside the desired operating range. If the system metric is outside the desired operating range, an adjustment to a computing resource can be implemented in order to return the system metric to the desired operating range, as determined in block 412. If the system metric is within the desired operating range, the routine 400 can return to block 406 to receive a new or updated measurement of the system metric. Because the CPU utilization in this example is 20% and the desired operating range is 60%-70%, the CPU utilization is outside the desired operating range. Specifically, the CPU utilization is below the desired operating range and the routine 400 proceeds to block 412.

At block 412, the fuzzy logic engine 306 determines the necessary adjustment to bring the system metric within the desired range. The fuzzy logic engine 306 can be configured to identify which capacity bands the system metric is within, and using this information the fuzzy logic engine 306 can perform a weighted calculation to determine the necessary adjustment. FIG. 3C illustrates an example chart 500 of the capacity bands used by the fuzzy logic engine 306.

Figure 3C:
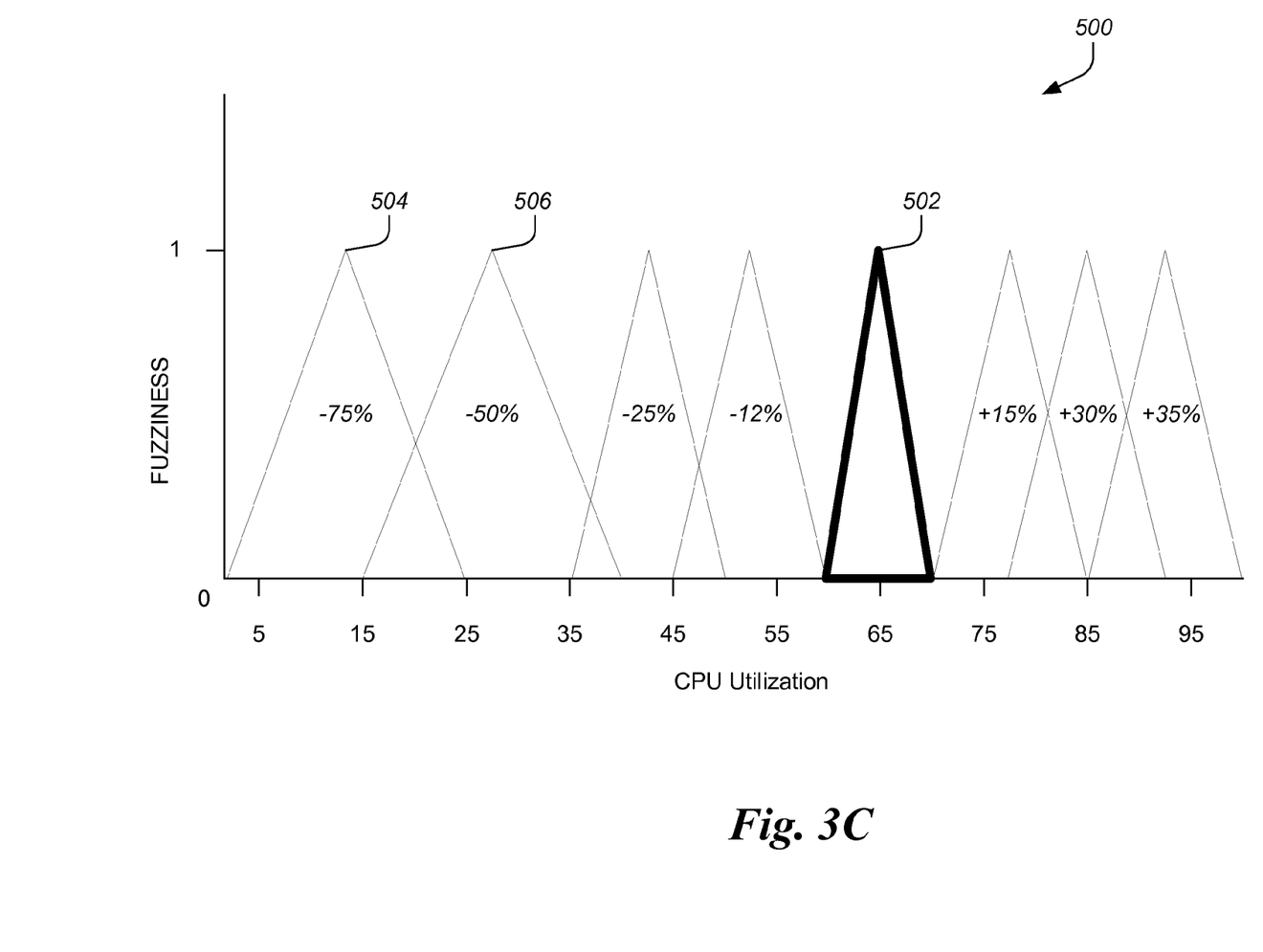
FIG. 3C is a chart illustrating an example of capacity bands that can be used by a fuzzy logic routine to calculate adjustments to computing resources for programs in a program execution service.

With reference now to the example chart 500 in FIG. 3C, example capacity bands 504, 506 that can be used by the fuzzy logic engine 306 in determining the necessary adjustment to implement based on the current CPU utilization are illustrated. The chart 500 is intended to be an illustrative example of CPU utilization capacity bands for use by an embodiment of a fuzzy logic engine and is not intended to be limiting. In other examples, the capacity bands for CPU utilization (or any system metric) can be different than shown in FIG. 3C.

In the example chart 500, the desired operating range 502 is shown bolded between 60% and 70% CPU utilization. Capacity band 504 is the first capacity band from the left in the chart 500, and encompasses CPU utilization from 0% to 25%. Capacity band 506 partially overlaps capacity band 504, and encompasses CPU utilization from 15% to 40%. Several other capacity bands are shown, covering the entire CPU utilization spectrum outside of the desired operating range, from 0% to 100%. Each capacity band outside of the desired operating range includes an adjustment rule. Capacity band 504 has an adjustment rule of negative 75%, and capacity band 506 has an adjustment rule of negative 50%. The adjustment rules correspond to the amount of computing resources to add or remove for a system metric that falls with each capacity band. Therefore, a system metric that falls within capacity band 504 indicates the need to remove 75% of the computing nodes 116 associated with the program, and a system metric that falls within capacity band 506 indicates that 50% of the computing nodes 116 associated with the program should be removed. The capacity bands 504 and 506 partially overlap, and the current system metric of 20% falls within the overlapping region of each band. Therefore, the fuzzy logic engine 306 can perform a weighted calculation based on these two capacity bands 504, 506 and their associated adjustment rules in order to determine the appropriate adjustment to make. In various implementations, any defuzzification method can be used. For example, the weighting may be based on the centroid or center of mass of the relevant areas of the capacity bands or the heights of the relevant portions of the capacity bands.

In this illustrative example, the weight that each adjustment rule is given is based on the area of the capacity band 504, 506 that falls between the point where the system metric lies on the x-axis of the chart 500 and the point where the desired operating range 502 begins on the x-axis of the chart 500. This corresponds to 20% of the area of the first capacity band 504 and 80% of the area of the second capacity band 506. Therefore, when performing the calculation, the fuzzy logic engine 306 will assign a weight of 0.2 to the recommended adjustment associated with the first capacity band 504, and a weight of 0.8 to the recommended adjustment associated with the second capacity band 506. Performing the weighted calculation, the fuzzy logic engine 306 determines that the relative adjustment to make to the computing resources is to scale down, by 55%, the number of computing nodes 116 assigned to execute the program in the program execution service 100. The fuzzy logic engine 306 can then translate this relative adjustment into the actual adjustment to make. For example, if there are currently 500 computing nodes 116 associated with the program, then the actual adjustment to make is to reduce the number of computing nodes 116 executing the user program by 275, resulting in a new capacity of 225 computing nodes 116. This number is above the lower threshold of 100 and below the upper threshold of 600, as calculated by the forecasting module 202 and received from the rule base 304, and therefore the fuzzy logic engine 306 can proceed to initiate this adjustment below.

Figure 3D:
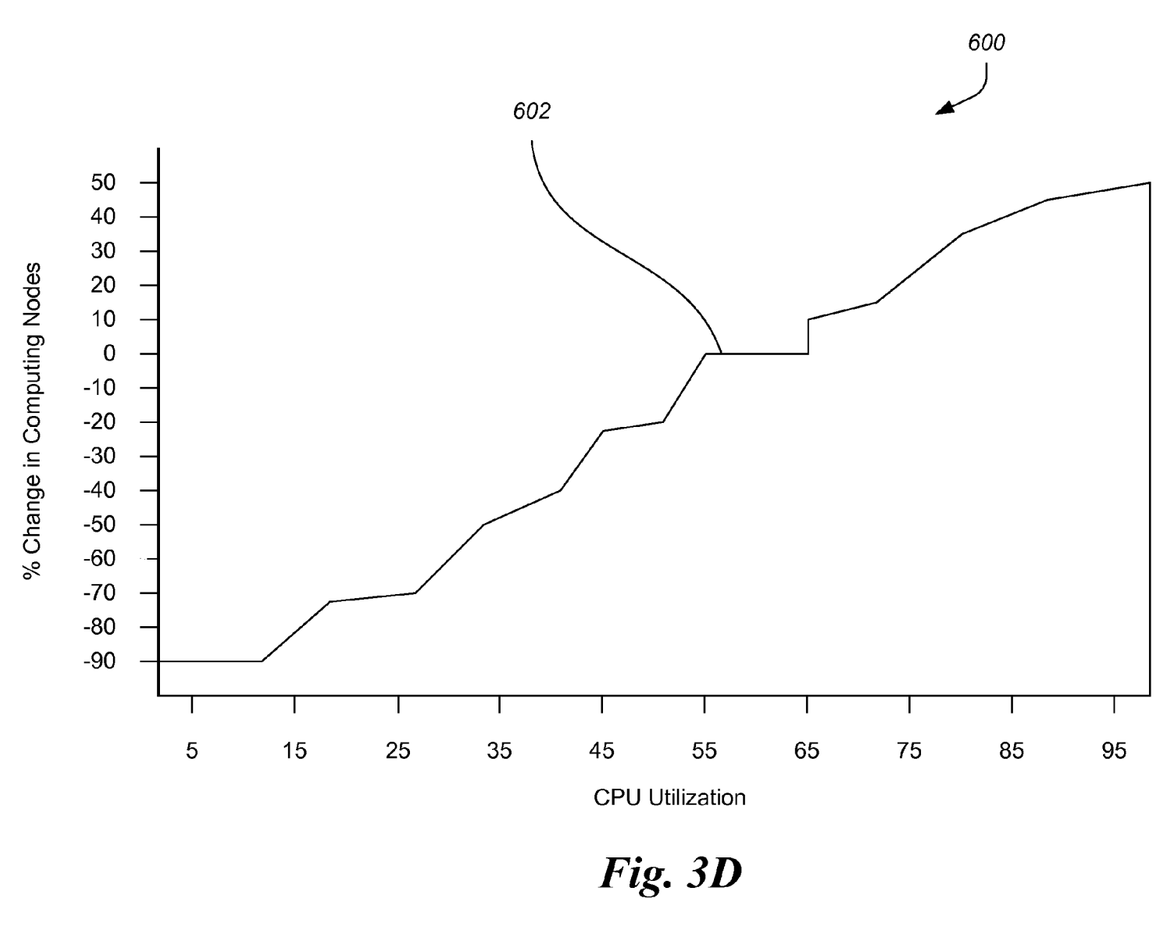
FIG. 3D is a graph illustrating an example simulated performance of a fuzzy logic routine used to determine a change in computing capacity as a function of average CPU utilization.

FIG. 3D is a graph 600 illustrating an example simulated performance of a fuzzy logic routine used to determine a change in computing capacity as a function of average CPU utilization. The x-axis of the graph 600 indicates average CPU utilization percentage, and the y-axis indicates a corresponding change in the number of computing nodes 116 associated with a program. The curve 602 graphically illustrates a simulated result of the calculation that the fuzzy logic engine 306 can perform for possible CPU utilization percentages, based on the example capacity bands illustrated in FIG. 3C.

The example fuzzy logic calculation described herein is merely illustrative, and is not meant to be limiting. In some embodiments, the fuzzy logic engine 306 can use different capacity bands than those illustrated in FIG. 3C and described above. For example, the capacity bands can be alternative shapes, such as trapezoids, etc. The CPU utilization range represented by each band can differ significantly, as can the adjustment rule associated with each capacity band. More or fewer capacity bands can be used, capacity bands representing different system metrics can be used, etc. In some embodiments, the magnitude of the recommended adjustments associated with the capacity bands can be set so that any decrease in computing resources associated with a program is less aggressive than would be the case if the adjustments were symmetric around the desired operating range. For example, if CPU utilization was measured to be 10% above the desired operating range, an aggressive adjustment of 100 additional computing nodes 116 can be made to bring the system metric back within the desired operating range. If CPU utilization were measure to be 10% below the desired operating range, a more passive adjustment of 50 fewer computing nodes 116 can be made to bring the system metric back within the desired operating range. Such a passive-aggressive strategy can help to ensure that users will not experience unacceptable performance degradation when computing resources are disassociated with the program that they are using, and that users will experience rapid and noticeable performance enhancement when additional computing resources are associate with the program. In some embodiments, other factors can be taken into consideration, such as whether system deployments are expected, which would normally add to the demand for computing resources even though there is no additional user interaction, etc.

Returning now to the example autoscaling routine 400 shown in FIG. 3B, at block 414, the fuzzy logic engine 306 can initiate implementation of the adjustment determined in block 412. For example, the fuzzy logic engine 306 can notify the implementation module 308 that an adjustment is needed, and provide information about the adjustment. In this example, the adjustment is the disassociation of 275 computing nodes 116 from the program. As described above with respect to FIG. 2B, the implementation module 308 can send disassociate commands to the appropriate number of computing nodes 116a, 116b, . . . , 116n in the program execution service 100. In some embodiments, the implementation module 308 can receive confirmation messages from the computing nodes 116a, 116b, . . . , 116n when they have terminated execution of the user program. In some embodiments, the implementation module 308 can determine whether the recommended adjustment is able to be fulfilled, in whole or in part. For example, the implementation module 308 may determine that fewer computing resources are available than are necessary to implement the adjustment. In such cases, the implementation module 308 can be configured to issue a notification to a system administrator, support ticketing system, etc. when this condition occurs. The implementation module 308 can also be configured to alter the adjustment, such as by substituting different computing resources, etc. In some embodiments, the various programs can be ranked in order of priority, so that when there are not sufficient computing resources to implement an adjustment, resources from a lower-priority program can be reassigned. Alternatively, a group of programs can be assigned to a pool of computing resources, and each program can be required to relinquish a portion of its computing resources when another program in the group requires them.

At block 416, the fuzzy logic engine 306 receives a new measurement of the system metric. The can be implemented as part of a feedback loop, wherein the routine 400 does not terminate until the system metric is within the desired operating range. In some embodiments, this can also include the feedback mechanism, described above with respect to the learning module 308, which can tune the capacity bands used by the fuzzy logic engine 306. The system metric can also be received as part of the normal monitoring schedule of the capacity manager 102. In some embodiments, the autoscaling routine 400 can create a new monitoring schedule designed to monitor the impact of the adjustment on the system metric on an expedited basis. When the fuzzy logic engine 306 receives a new measurement, execution returns to block 410 to determine whether the system metric is again outside of the desired operating range. From there, execution of the routine 400 continues until the system metric is within the desired operating range. When system metric is determined to be within the desired operating range at block 410, execution can return to block 406 where the routine 400 can start over, for example, to continue monitoring the same or different system metric. Thus, certain embodiments of the disclosed systems and methods can provide for continuous and automatic scaling of computing capacity to meet desired goals or objectives (e.g., operating ranges) of users or administrators of the program execution service 100.

CONCLUSION

In various implementations, the systems and methods described herein can be used with embodiments of a program execution service that provide computing capacity to users or entities. In some such implementations, the program execution service provides computing capacity for a retail website, such as an electronic catalog system or e-commerce system. For example, the system may monitor and forecast user or customer traffic patterns for a web-based e-commerce system, and automatically scale computing capacity so that the e-commerce system can reduce latency of user/customer traffic and provide high-quality service and a consistent experience for the users or customers.

In some implementations, some or all of the disclosed features can be provided by a third-party system not associated with the program execution service. Such a third-party system may, for example, interact with the program execution service (or other system or database) to obtain or retrieve relevant information (e.g., operating ranges, system metrics, capacity bands, etc.) in order to determine appropriate changes to computing capacity that may be made to bring a system metric to be within a desired operating range.

Each of the processes, methods, routines, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system configured to manage execution of programs in a program execution service that provides a plurality of computing resources, the system comprising tangible computing hardware programmed to at least:
    receive a system metric that relates to usage of a computing resource associated with a program executed by the program execution service;
    determine whether the system metric is within a desired operating range; and
    in response to a determination that the system metric is not within the desired operating range:
        utilize feedback to:
            determine an adjustment to a quantity of the computing resource associated with the program based at least partly on an adjustment rule associated with a capacity band; and
            update the adjustment rule or the capacity band based at least partly on a subsequent determination that the system metric is outside the desired operating range.

2. The system of claim 1, wherein to determine the adjustment to the quantity of the computing resource, the system is programmed to apply fuzzy logic based at least partly on the adjustment rule and the capacity band.

3. The system of claim 1, wherein the system metric relates to CPU utilization, network bandwidth, network latency, computing resource accessibility, persistent storage utilization, memory utilization, transactions, requests, number of users accessing the program, a length of time the program has been running in the program execution service, or traffic to the computing resources.

4. The system of claim 1, wherein the receipt of the system metric is based on a monitoring schedule for usage of the computing resource, and the system is further programmed to update the monitoring schedule to monitor impact of the adjustment to the quantity of the computing resource.

5. The system of claim 1, wherein the system is further programmed to add new adjustment rules or capacity bands based on the feedback.

6. The system of claim 1, wherein the system is further programmed to:
    receive a threshold associated with an upper or lower amount of the computing resource; and
    determine that the adjustment to the quantity of the computing resource does not cause the quantity of the computing resource to pass the threshold.

7. The system of claim 6, wherein the system is further programmed to forecast demand for the computing resource and to determine the threshold based at least in part on the forecasted demand.

8. A computer-implemented method for controlling a quantity of a computing resource associated with a program in a program execution service, wherein the program execution service provides a plurality of computing resources associable with one or more programs, the method comprising:

under control of a program execution service that provides computing resources associated with one or more programs of multiple users of the program execution service:

forecasting a demand for the computing resource associated with execution of the program by the program execution service;

determining an upper threshold and a lower threshold for the quantity of computing resource that may be associated with the program;

monitoring a system metric to determine whether the system metric is within a desired operating range, wherein the system metric is associated with execution of the program by the program execution service; and determining an adjustment to a quantity of the computing resource based at least partly on one or more capacity bands associated with the system metric, wherein the adjustment is between the lower threshold and the upper threshold.

9. The computer-implemented method of claim 8, wherein determining the adjustment to the quantity of the computing resource comprises weighting estimated quantities of adjustments based at least partly on a relationship between the system metric and the one or more capacity bands.

10. The computer-implemented method of claim 8, wherein the determined adjustment is based at least in part on which bands, of the one or more bands, the system metric is within.

11. The computer-implemented method of claim 8, further comprising automatically adjusting the quantity of the computing resource based at least in part on the determined adjustment.

12. The computer-implemented method of claim 8, wherein at least monitoring the system metric and determining the adjustment to the quantity of the computing resource are performed in a feedback loop.

13. A computer-implemented method for controlling a quantity of a computing resource associated with a program in a program execution service, the method comprising:

under control of a program execution service comprising a plurality of hardware computing devices, wherein individual hardware computing devices are configurable to execute one or more programs on behalf of users of the program execution service:

receiving a system metric relating to usage of a computing resource associated with a program executed by the program execution service;

determining if the system metric is within a desired operating range; and in response to a determination that the system metric is not within the desired operating range, calculating an adjustment to a quantity of the computing resource associated with the program based at least partly on a capacity band selected from a plurality of capacity bands associated with the system metric.

14. The computer-implemented method of claim 13, wherein calculating the adjustment to the quantity of the computing resource comprises apply fuzzy logic to the capacity band.

15. The computer-implemented method of claim 13, further comprising:

forecasting a demand for the computing resource;

determining a threshold associated with an upper or lower amount of the computing resource; and determining that the adjustment does not cause the quantity of the computing resource to pass the threshold.

16. The computer-implemented method of claim 13, wherein the desired operating range is based at least partly on one or more of a date, a time of day, occurrence of a special event or a system deployment, geographic information, or pricing goals.

17. The computer-implemented method of claim 13, wherein calculating the adjustment to the quantity of the computing resource is based at least in part on whether the capacity band is below the desired operating range or above the desired operating range.

18. The computer-implemented method of claim 17, wherein the calculated adjustment for a capacity band below the desired operating range is smaller than the calculated adjustment for a capacity band that is a corresponding amount above the desired operating range.

19. The computer-implemented method of claim 13, wherein calculating the adjustment to the quantity of computing resources comprises weighting estimated quantities of adjustments based at least in part the capacity band and at least one other capacity band selected from the plurality of capacity bands.

20. The computer-implemented method of claim 13, wherein calculating the adjustment to the quantity of computing resources comprises calculating an adjustment magnitude based at least in part on how far outside the desired operating range the system metric is determined to be.

* * * * *